(12) United States Patent
Wang et al.

(10) Patent No.: US 12,375,137 B2
(45) Date of Patent: Jul. 29, 2025

(54) BASE STATION AND TERMINAL

(71) Applicant: NTT DOCOMO, INC., Tokyo (JP)

(72) Inventors: Xin Wang, Beijing (CN); Xiaolin Hou, Beijing (CN); Anxin Li, Beijing (CN); Lan Chen, Beijing (CN); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/258,641

(22) PCT Filed: Feb. 1, 2021

(86) PCT No.: PCT/CN2021/074690
§ 371 (c)(1),
(2) Date: Jun. 21, 2023

(87) PCT Pub. No.: WO2022/160344
PCT Pub. Date: Aug. 4, 2022

(65) Prior Publication Data
US 2024/0056142 A1 Feb. 15, 2024

(51) Int. Cl.
*H04B 7/0456* (2017.01)
(52) U.S. Cl.
CPC ................. *H04B 7/0478* (2013.01)
(58) Field of Classification Search
CPC .. H04B 7/0417; H04B 7/0456; H04B 7/0478; H04B 7/06; H04B 7/061; H04B 7/0617;

(Continued)

(56) References Cited

U.S. PATENT DOCUMENTS

2013/0100922 A1* 4/2013 Ahn ................... H04W 72/0446
370/329
2016/0269089 A1* 9/2016 Liu .................... H04W 72/0446
(Continued)

FOREIGN PATENT DOCUMENTS

BR 112019027786 A2 * 7/2020 ........... H04L 5/0007
CN 101257367 A 9/2008

OTHER PUBLICATIONS

Sawahashi et al. "CSI Reference Signal Multiplexing Using Carrier Frequency Swapping for FDD High-Order MIMO SDM", 2014 IEEE 80th Vehicular Technology Conference (VTC2014-Fall).*

(Continued)

*Primary Examiner* — Young T. Tse
(74) *Attorney, Agent, or Firm* — Osha Bergman Watanabe & Burton LLP

(57) ABSTRACT

The present disclosure provides a base station and a terminal. The base station includes: a receiving unit configured to receive precoding matrix indicator information of a first granularity from a terminal; and a processing unit configured to perform channel reconstruction according to the precoding matrix indicator information to obtain a first channel, use a super-resolution network to perform interpolation and denoising processing on a channel having the first granularity to obtain a second channel, and perform downlink precoding on the second channel, wherein the first channel has the first granularity, the second channel has a second granularity, and the second granularity is finer than the first granularity.

3 Claims, 10 Drawing Sheets

(58) Field of Classification Search
CPC .. H04B 7/0619; H04B 7/0626; H04B 7/0632; H04B 7/0639; H04B 7/066; H04B 7/0862
USPC ........ 375/259, 260, 262, 265, 267; 370/208, 370/210, 328–330, 335, 337, 342, 344, 370/347; 455/69, 70, 513
See application file for complete search history.

(56) References Cited

U.S. PATENT DOCUMENTS

| | | | | |
|---|---|---|---|---|
| 2018/0083676 | A1* | 3/2018 | Wei | H04L 1/0031 |
| 2019/0372641 | A1* | 12/2019 | Muruganathan | H04B 7/0626 |
| 2020/0204238 | A1* | 6/2020 | Na | H04W 72/04 |
| 2021/0344399 | A1* | 11/2021 | Levy | H04L 5/0053 |

OTHER PUBLICATIONS

International Search Report issued in PCT/CN2021/074690 on Oct. 20, 2021 (7 pages).
Written Opinion of the International Searching Authority issued in PCT/CN2021/074690 on Oct. 20, 2021 (9 pages).

* cited by examiner

BASE STATION AND TERMINAL

TECHNICAL FIELD

The present disclosure relates to a field of wireless communication, and in particular to a base station for performing channel reconstruction according to feedback from a terminal and a corresponding terminal.

BACKGROUND

In a communication system, a base station transmits a downlink reference signal to a UE, the UE performs channel estimation according to the downlink reference signal and transmits Precoding Matrix Indicator (PMI) information of Type I or Type II to the base station. The base station may determine corresponding codewords and combination coefficients related to the codewords according to the PMI information transmitted by the UE to reconstruct a channel, and use the reconstructed channel for downlink precoding. Currently, the PMI information of Type II transmitted by the UE is subband-level PMI information, which leads to large quantization granularity in space domain and frequency domain, and large quantization granularity in combination coefficients. Correspondingly, the base station reconstructs a subband-level channel based on the subband-level PMI information transmitted by the UE. On the other hand, in a 5G NR system, the base station may perform precoding using the reconstructed channel in unit of Physical Resource Block (PRB) bundling, while the granularity of PRB bundling is usually much smaller than that of PMI information.

For example, in the case where a communication bandwidth between the base station and the UE is 100 MHz and the Subcarrier Spacing (SCS) is 30 kHz, one subband may include 16 Resource Blocks (RBs). The UE may transmit subband-level (i.e., 16 RBs) PMI information of type II. On the other hand, the minimum size of PRB bundling may be 2 RBs, which is much smaller than the granularity of the PMI information.

In addition, when reconstructing a subband-level channel according to PMI information, it will bring relatively large errors to quantization noise of space domain and coefficients, which reduces the ability of various Multiple-Input Multiple-Output (MIMO) precoding to eliminate inter-user interference. Therefore, there is a need to reduce the quantization noise.

SUMMARY OF THE DISCLOSURE

According to an aspect of the present disclosure, a base station is provided. The base station includes: a receiving unit configured to receive precoding matrix indicator information of a first granularity from a terminal; a processing unit configured to perform channel reconstruction according to the precoding matrix indicator information to obtain a first channel, use a super-resolution network to perform interpolation and denoising on a channel having the first granularity to obtain a second channel, and perform downlink precoding on the second channel, where the first channel has the first granularity, the second channel has a second granularity, the second granularity is finer than the first granularity.

According to another aspect of the present disclosure, another base station is provided. The base station includes: a receiving unit configured to receive precoding matrix indicator information of a first granularity from a terminal; a processing unit configured to perform channel reconstruction, interpolation and denoising according to the precoding matrix indicator information of the first granularity via a first subnetwork to obtain a second channel, and perform downlink precoding on a channel of a second granularity, where the second granularity is finer than the first granularity.

According to another aspect of the present disclosure, another base station is provided. The base station includes: a transmitting unit configured to transmit first channel state information reference information of a first density to a terminal; a receiving unit configured to receive first feedback information for the first channel state information reference information from the terminal; where the first feedback information includes first channel response information obtained from first channel estimation by the terminal according to the first channel state information reference information, and precoding matrix indicator information determined by the terminal according to down-sampled first channel state information reference information.

According to another aspect of the present disclosure, a terminal is provided. The terminal includes: a receiving unit configured to receive first channel state information reference information of a first density; a processing unit configured to perform first channel estimation according to the first channel state information reference information to obtain first channel response information, and perform down-sampling on the first channel state information reference information, and determine precoding matrix indicator information according to down-sampled channel state information reference information; and a transmitting unit configured to transmit the first channel response information and the precoding matrix indicator information to a base station.

BRIEF DESCRIPTION OF THE DRAWINGS

The above and other objects, features and advantages of the present disclosure will become more apparent by describing embodiments of the present disclosure in more detail with reference to accompanying drawings. The accompanying drawings are provided to provide a further understanding of the embodiments of the present disclosure, constitute a part of the specification, serve to explain the present disclosure together with the embodiments of the present disclosure, and do not constitute a limitation to the present disclosure. In the drawings, like reference numerals generally represent like components or steps.

DESCRIPTION OF THE EMBODIMENTS

Figure 1:
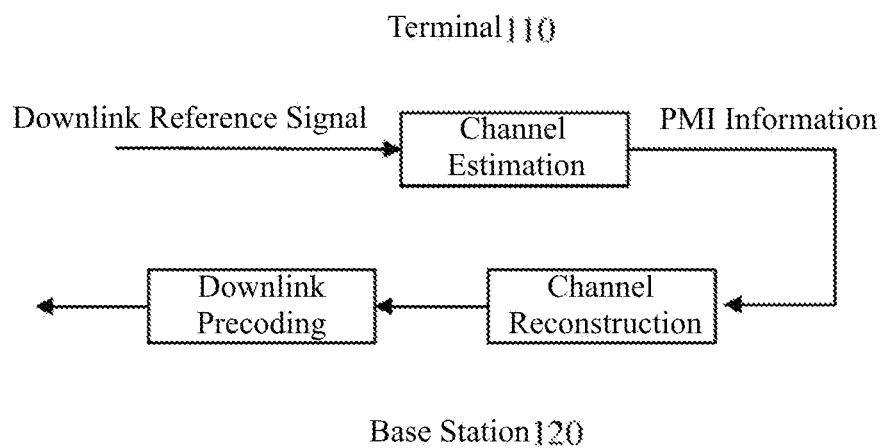
FIG. 1 is a schematic diagram illustrating that a base station performs channel reconstruction according to feedback from a terminal in a communication system.

In order to make the objects, technical solutions, and advantages of the present disclosure more apparent, exemplary embodiments according to the present disclosure will be described in detail below with reference to the accompanying drawings. Like reference numerals represent like elements throughout the drawings. It should be understood that the embodiments described herein are illustrative only and should not be construed as limiting the scope of the present disclosure. In addition, a terminal described herein may include various types of terminals, such as a user equipment (UE), a mobile terminal (or referred to as mobile station) or fixed terminal. However, for convenience, a terminal and UE sometimes may be used interchangeably hereinafter.

FIG. 1 is a schematic diagram illustrating that a base station performs channel reconstruction according to feedback from a terminal in a communication system. As shown in FIG. 1, a terminal 110 performs channel estimation according to a downlink reference signal, and obtains Precoding Matrix Indicator (PMI) information of Type I or Type II according to a channel estimation result for transmission to a base station 120. The base station 120 reconstructs a channel according to the PMI information transmitted by the UE, and performs downlink precoding using the reconstructed channel. An ideal spatial-time domain channel H desired by the base station may be expressed by the following Formula (1):

$$H = \sum_{i=1}^{N} \alpha_i F(\tau_i, \varphi_i, \theta_i, \phi_i) \quad (1)$$

where the space-time domain channel H may be regarded as a superposition of N multipath components, with an amplitude of $\alpha_i$ for each multipath component, and may be written as a function F of delay $\tau_i$, horizontal angle of arrival pi, vertical angle of arrival $\theta_i$, and phase $\varphi_i$. At present, it is very difficult to estimate the respective parameters in the above formula one by one based on the downlink reference signal, making it hard to accurately recover the channel.

Figure 2:
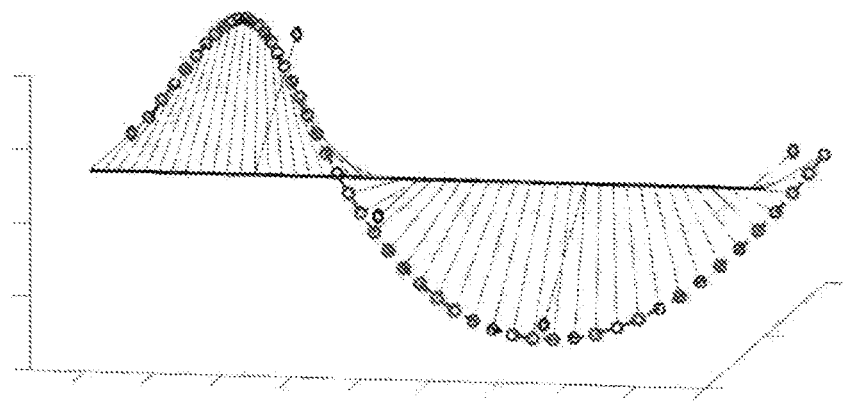
FIG. 2 is a schematic diagram illustrating channel state information (CSI) determined according to PMI information fed back by a terminal and ideal CSI in an existing communication system.

Specifically, in a current communication system, the terminal 110 transmits subband-level PMI information of type II. This leads to large quantization granularity in spatial domain and frequency domain, and large quantization granularity in combination coefficients. Correspondingly, a channel reconstructed by the base station 120 according to the PMI information is also a subband-level channel, resulting in coarse granularity of the reconstructed channel. FIG. 2 is a schematic diagram illustrating channel state information (CSI) determined according to PMI information fed back by a terminal and ideal CSI in the current communication system. In the example shown in FIG. 2, the rhombus represents the CSI determined according to the PMI information fed back by the terminal, and the circle represents the ideal channel state information. As shown in FIG. 2, the granularity of the CSI determined according to the PMI information fed back by the terminal is far coarser than the ideal channel state information. The spectral efficiency when the base station uses the CSI directly reconstructed based on PMI has more than 50% loss compared to the case of using the ideal CSI.

On the other hand, in a 5G NR system, the base station may perform precoding using a reconstructed channel in unit of PRB bundling, while the granularity of PRB bundling is usually much smaller than that of PMI information.

In addition, when reconstructing a subband-level channel according to PMI information, it will bring relatively large errors to quantization noise of space domain and coefficients, which reduces the ability of various Multiple-Input Multiple-Output (MIMO) precoding to eliminate inter-user interference. Therefore, there is a need to reduce the quantization noise.

Figure 3:
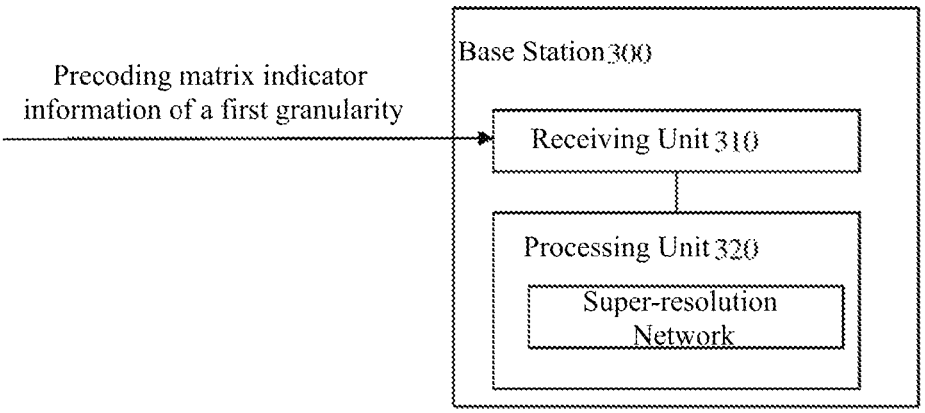
FIG. 3 is a schematic block diagram illustrating a base station according to an embodiment of the present disclosure.

Hereinafter, a base station according to an embodiment of the present disclosure will be described with reference to FIG. 3. FIG. 3 is a schematic block diagram illustrating a base station according to an embodiment of the present disclosure. As shown in FIG. 3, a base station 300 according to an embodiment of the present disclosure may include a receiving unit 310 and a processing unit 320. In addition to the receiving unit and the processing unit, the base station 300 may further include other components. However, since these components are irrelevant to the contents of the embodiments of the present disclosure, illustration and description thereof are omitted herein.

As shown in FIG. 3, the receiving unit 310 of the base station 300 receives precoding matrix indicator information of a first granularity from a terminal. The processing unit 320 performs channel reconstruction according to the precoding matrix indicator information to obtain a first channel, where the first channel has a first granularity. For example, the receiving unit 310 may receive subband-level PMI information of Type II from the terminal. Specifically, the PMI information of Type II may include space-domain codeword selection information, amplitude information and phase information of wideband-level and subband-level codeword combination coefficients, and may also include frequency-domain codeword selection information and space-frequency domain codeword combination coefficients. The processing unit 320 may use the amplitude information and the phase information in the PMI information received by the receiving unit 310 to perform amplitude and phase weighting on space domain (also referred to as "beam domain")-frequency domain channel codewords of multiple beams respectively, and combine the weighted vectors to obtain a first channel with a subband level. The combined subband-level first channel may be expressed in the form of a space-frequency domain channel matrix, where a space-domain value of the space-frequency domain channel matrix may be the number of antennas used by the base station 300 to communicate with the terminal, and a frequency-domain value may be determined according to the number of subbands over which the base station 300 communicates with the terminal.

Thereafter, the processing unit 320 uses a super-resolution network to perform interpolation and denoising on the channel of the first granularity to obtain a second channel, where the second channel has a second granularity, and the second granularity is finer than the first granularity. For example, the channel of the first granularity may be a subband-level channel, as described above. In this case, the channel of the second granularity may be a subcarrier-level or a resource block (RB)-level channel.

According to an example of the present disclosure, before inputting the first channel of the first granularity into the super-resolution network, the processing unit 320 may perform preprocessing on the first channel, so as to facilitate subsequent operations of the super-resolution network. For example, in the case where the first channel is a space-frequency domain channel, the processing unit 320 may perform Fourier transform on the first channel to transform the space-frequency domain channel into a beam-delay domain channel. In addition, since in the beam-delay domain, channel delay components are mainly concentrated in a header of a delay-domain channel matrix, the processing unit 320 may truncate the delay-domain channel, keep the header, and divide the truncated data into two channels, a real part and an imaginary part, as inputs to the super-resolution network. By transforming the first channel to be processed into the delay domain and truncating the data, computational complexity of the super-resolution network can be reduced.

In addition, in order to further simplify the operations of the super-resolution network, before transforming it to the beam-delay domain channel, the processing unit 320 may further use conventional interpolation methods such as zero-filling, linear interpolation, nearest neighbor interpolation and the like to pre-interpolate the first channel, so as to obtain a channel with a desired frequency-domain accuracy (e.g., the RB level or the subcarrier level). It should be understood that the pre-interpolation operation only formally increases channel dimension to output dimension to facilitate subsequent network processing, but does not substantially improve the accuracy of the channel. The super-resolution interpolation for the channel matrix is done via the super-resolution network.

According to an example of the present disclosure, the processing unit 320 may use various types of super-resolution networks. The first channel of the first granularity may be interpolated and denoised in a method similar to that of using a super-resolution network to perform interpolation and denoising of images. In addition, the super-resolution network may be pre-trained using high-density reference signals. For example, the base station 300 may further include a transmitting unit, so as to transmit a high-density reference signal to at least one of a user equipment and a data collection device, and receive feedback information for the first channel state information reference information from at least one of the user equipment and the data collection device. The processing unit 320 may use the feedback information for the first channel state information reference information to train the super-resolution network, so that the super-resolution network learns to obtain, through interpolation and denoising, a candidate set of channel parameters and the function F as shown in the above-mentioned Formula (1) corresponding to the specific feedback information. Therefore, during actual deployment, the processing unit 320 may input the first channel obtained according to the precoding matrix indicator information fed back by the terminal into the trained super-resolution network to recover the channel accurately.

For example, the processing unit 320 may use at least one of a Very Deep Super Resolution (VDSR) network and a Cascading Residual Network (CARN) to perform interpolation and denoising on the channel of the first granularity to obtain the second channel. Specifically, the processing unit 320 may use VDSR with 16-20 layers and a convolution kernel size of 3 to perform interpolation and denoising on the channel of the first granularity to obtain the second channel. Since a very deep network is conducive to learning characteristics in channels, using a very deep network can perform better channel recovery. In addition, according to an example of the present disclosure, a residual network structure may be applied in a very deep super-resolution network. Specifically, an input may be superimposed before an output layer to enhance correspondence between the output and the input.

Alternatively, the processing unit 320 may further use a cascading residual convolutional network formed by introducing multiple small convolutional networks into the residual structure. In the cascading residual network, each small convolutional network may be a 3-layer convolutional network, and the convolution kernel size is 3. Compared with the very deep super-resolution network, the cascading residual network can achieve better performance with less complexity.

Finally, the processing unit 320 performs downlink precoding on the second channel for transmission to the terminal. In the embodiment described in conjunction with FIG. 3, after conventional channel reconstruction according to the precoding matrix indicator information, the processing unit of the base station uses the super-resolution network to interpolate and denoise the channel of the first granularity to obtain the second channel with a finer granularity for downlink precoding.

Figure 4:
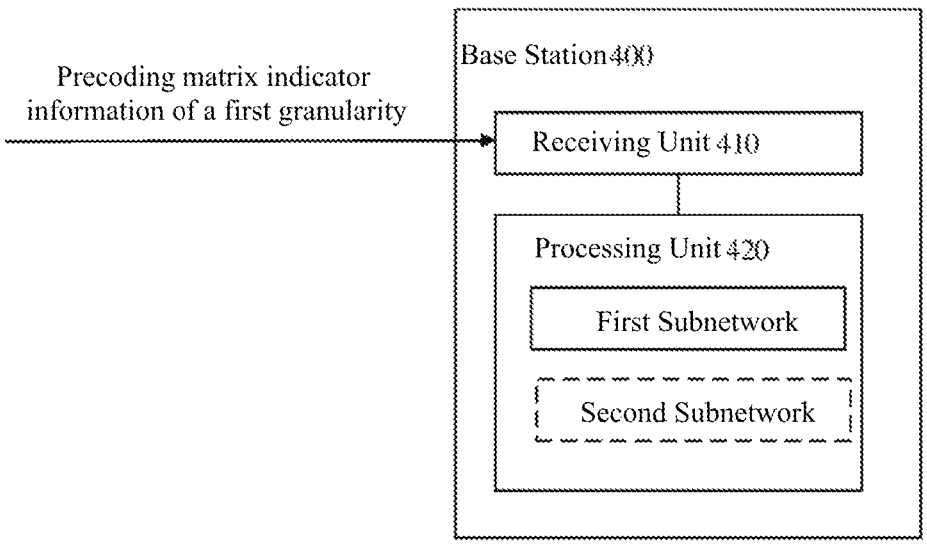
FIG. 4 is a schematic block diagram illustrating a base station according to another embodiment of the present disclosure.

According to another embodiment of the present disclosure, in addition to interpolation and denoising, a neural network may further be used to perform channel reconstruction according to the precoding matrix indicator information of the first granularity received from the terminal. A base station according to another embodiment of the present disclosure will be described below with reference to FIG. 4. FIG. 4 is a schematic block diagram illustrating a base station according to another embodiment of the present disclosure. As shown in FIG. 4, a base station 300 according to an embodiment of the present disclosure may include a receiving unit 410 and a processing unit 420. In addition to the receiving unit and the processing unit, the base station 400 may further include other components. However, since these components are irrelevant to the contents of the embodiments of the present disclosure, illustration and description thereof are omitted herein.

As shown in FIG. 4, the receiving unit 410 of the base station 400 receives precoding matrix indicator information of a first granularity from a terminal. For example, the receiving unit 410 may receive subband-level PMI information of Type II from the terminal. Specifically, PMI information of Type II may include subband-level amplitude information and phase information.

The processing unit 420 performs channel reconstruction, interpolation and denoising according to the precoding matrix indicator information of the first granularity via a first subnetwork to obtain a second channel, and performs downlink precoding on the channel of a second granularity, where the second granularity is finer than the first granularity. Specifically, the first subnetwork may be a first sub-neural network.

According to an example of the present disclosure, an input dimension of the first subnetwork may be higher than an output dimension of the first subnetwork. In other words, the first subnetwork adopts a high-dimensional input and low-dimensional output design. Because of the high-dimensional input, original information from the precoding matrix indicator information can be reserved, and because of the low-dimensional output, network complexity and training difficulty can be reduced by dimension reduction in a network processing process.

Specifically, an input of the first subnetwork may be the precoding matrix indicator information from the terminal or preprocessed precoding matrix indicator information, and the first subnetwork may perform input reconstruction on the precoding matrix indicator information. According to an example of the present disclosure, the first subnetwork may weight and combine magnitude and phase of the input data. For example, the precoding matrix indicator information may include amplitude information and phase information. Furthermore, the amplitude information may include wideband beam information, wideband amplitude information of each beam, and subband amplitude information of each subband as well as subband phase information of each subband that the base station 400 communicates with the terminal. The first subnetwork may combine the wideband beam information and the wideband amplitude information of each beam, and the subband amplitude information of each subband to obtain a channel amplitude matrix. Specifically, the first subnetwork may obtain the channel amplitude matrix in each polarization direction respectively according to polarization directions of elements of an antenna array. In addition, the first subnetwork may obtain a real part matrix and an imaginary part matrix according to the wideband beam information of each beam and the phase information of each subband. Similarly, the first subnetwork may obtain the real part matrix and the imaginary part matrix in each polarization direction respectively according to polarization directions of beams. Then, in each polarization direction, the first subnetwork may multiply the channel amplitude matrix with the real part matrix and the imaginary part matrix in that polarization direction, respectively, to obtain a beam-frequency domain channel matrix (also referred to as "beam-frequency domain channel" for short).

For example, base station 400 communicates with the terminal using beams in two polarization directions. The first subnetwork may obtain channel amplitude matrices A1 and A2 in two polarization directions, and channel phase matrices (i.e., the real part matrices and the imaginary part matrices) Pr1, Pr2, Pi1 and Pi2 in the two polarization directions. The first subnetwork may obtain the beam-frequency domain channel matrices Hr1, Hr2, Hi1, Hi2 by the following Formula (2):

$$Hr1=A1*Pr1, Hr2=A2*Pr2;$$

$$Hi1=A1*Pi1, Hi2=A2*Pi2 \quad (2)$$

where the "*" in Formula (2) indicates multiplication of corresponding elements of the matrices.

Next, the first subnetwork may perform Fourier transform on the beam-frequency domain channel to transform the beam-frequency domain channel into a beam-delay domain channel. In addition, since in the beam-delay domain, channel delay components are mainly concentrated in a header of the delay-domain channel matrix, the first subnetwork may truncate the delay-domain channel to reduce output dimension.

According to an example of the present disclosure, the first subnetwork may include a fully connected layer (or dense layer), and perform input reconstruction on the precoding matrix indicator information through the fully connected layer. Specifically, the fully connected layer weights and combines amplitude and phase of input data to obtain a beam-frequency domain channel, transforms the beam-frequency domain channel into a beam-delay domain channel, and truncates the beam-delay domain channel to reduce output dimension of the network. Alternatively, since the operation required in the weighting and combination process is only to multiply corresponding elements of respective matrices, the corresponding fully connected layer may be replaced by a partially connected layer, which only connects elements that need to be directly multiplied.

According to another example of the present disclosure, the first subnetwork may further include one or more super-resolution networks for interpolation and denoising. The one or more super-resolution networks may be set before or after the fully-connected layer or the partially-connected layer described above. In addition, the above-mentioned fully connected layer or partially connected layer may also be set between multiple super-resolution networks. The super-resolution network according to the embodiment of the present disclosure has been described above in detail with reference to the example shown in FIG. 3, which thus are not repeatedly described herein.

Figure 14A:
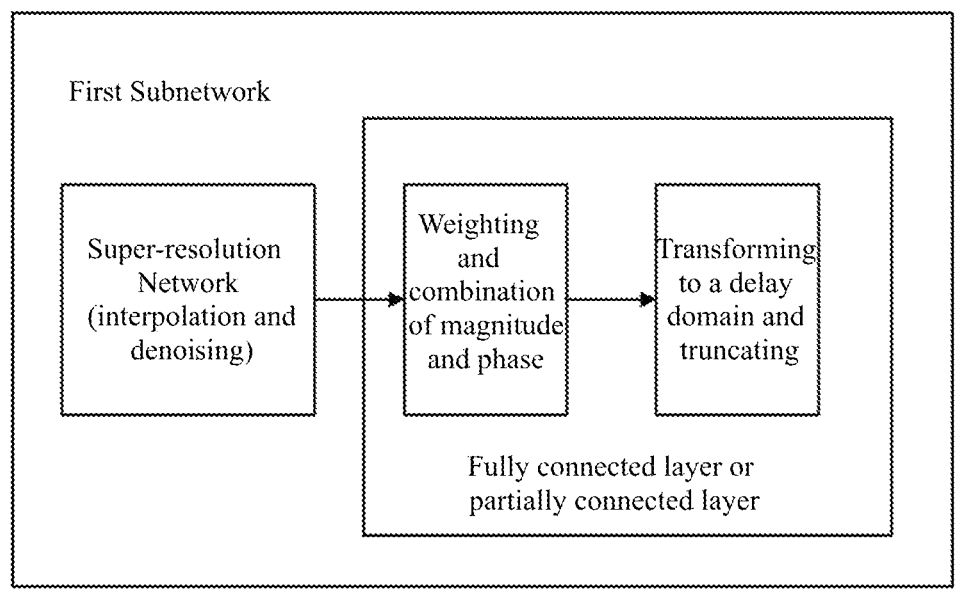
FIGS. 14A-14C are schematic diagrams illustrating structure of a first subnetwork according to an embodiment of the present disclosure.
Figure 14B:
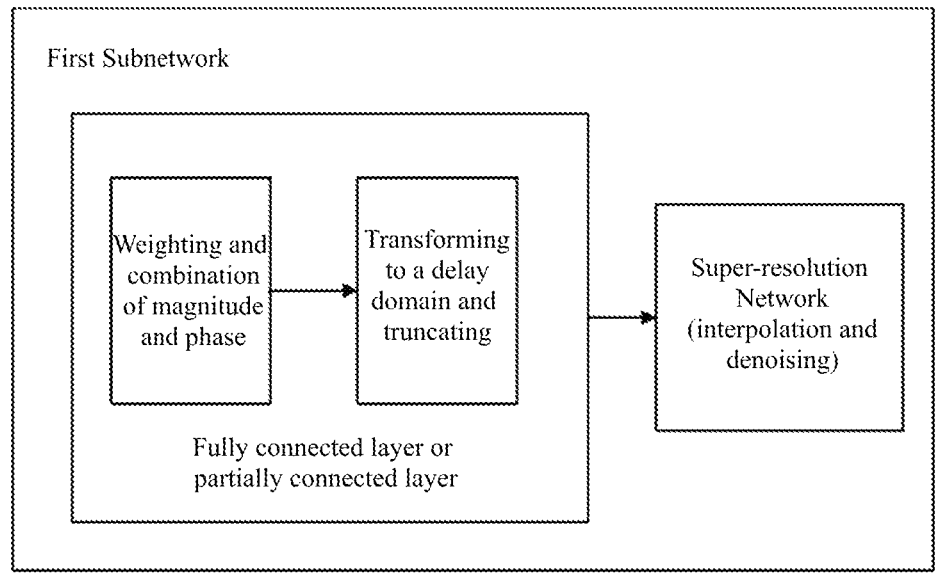
Figure 14C:
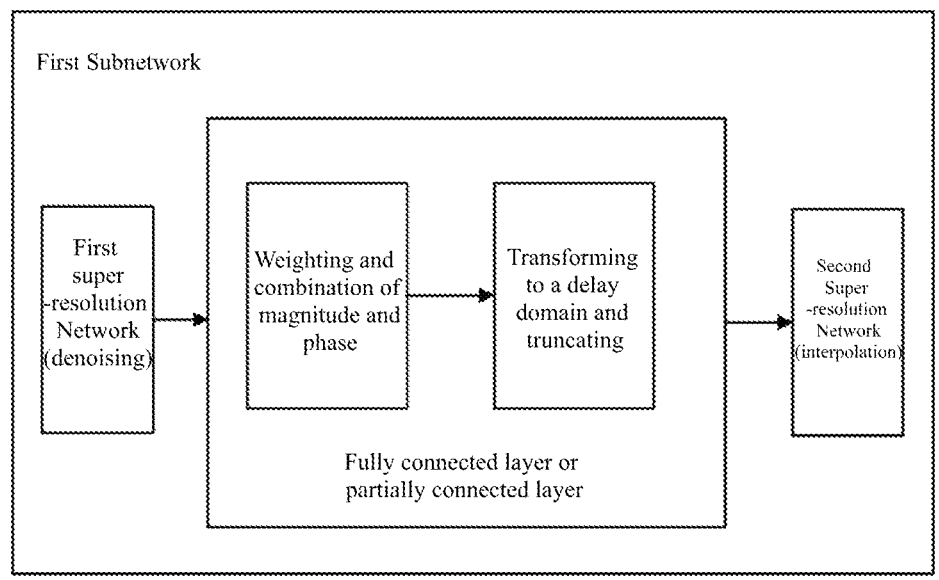

FIGS. 14A-14C are schematic diagrams illustrating structure of a first subnetwork according to an embodiment of the present disclosure. For example, as shown in FIG. 14A, the super-resolution network may be set before the fully connected layer or the partially connected layer to interpolate and denoise the precoding matrix indicator information from the terminal. The interpolated and denoised data are then input to the fully connected layer or the partially connected layer for channel reconstruction and dimensionality reduction. As another example, as shown in FIG. 14B, the precoding matrix indicator information from the terminal may be input into the fully connected layer or the partially connected layer for channel reconstruction and dimensionality reduction firstly, and then the resulted channel may be input to the super-resolution network for interpolation and denoising. As another example, as shown in FIG. 14C, the precoding matrix indicator information from the terminal may be input to a first super-resolution network for denoising. The denoised data is then input to the fully connected layer or the partially connected layer for channel reconstruction and dimensionality reduction. Finally, the dimensionally reduced channel is input to a second super-resolution network for interpolation.

Optionally, according to another example of the present disclosure, the processing unit 400 may also perform, via a second subnetwork, at least one of time-domain channel estimation enhancement and time-domain prediction on a plurality of second channels obtained according to precoding matrix indicator information transmitted from a same terminal for multiple times. For example, the first subnetwork may process the precoding matrix indicator information transmitted by the terminal once (e.g. within a single slot), and perform channel reconstruction, interpolation, and denoising based on the precoding matrix indicator information transmitted by the terminal once. The second subnetwork includes at least one of a Recurrent Neural Network (RNN) and a Long and Short-Term Memory (LSTM) network, and the second subnetwork may input the precoding matrix indicator information transmitted by the same terminal for multiple times to the RNN/LSTM network to realize at least one of time-domain channel estimation enhancement and time-domain prediction.

The channel state information reference information transmitted by the base station according to an embodiment of the present disclosure will be described below with reference to FIG. 5. The channel state information reference information described below in conjunction with FIG. 5 may be applied to the base station described in conjunction with FIG. 3 and FIG. 4.

Figure 5:
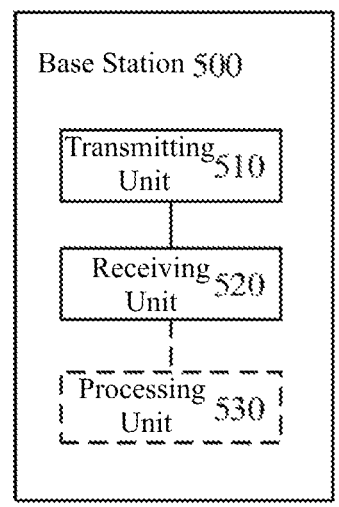
FIG. 5 is a schematic block diagram illustrating a base station according to another embodiment of the present disclosure.

FIG. 5 is a schematic block diagram illustrating a base station according to another embodiment of the present disclosure. As shown in FIG. 5, a base station 500 according to another embodiment of the present disclosure may include a transmitting unit 510 and a receiving unit 520. In addition to the transmitting unit and the receiving unit, the base station 500 may further include other components, however, since these components are irrelevant to the contents of the embodiments of the present disclosure, illustration and description thereof are omitted herein.

As shown in FIG. 5, the transmitting unit 510 transmits first channel state information reference information of a first density to a terminal. The first density may be a high density. In addition, according to an example of the present disclosure, the transmitting unit 510 transmits the first channel state information reference information over an entire communication bandwidth of the base station 500 at the first density. In other words, the transmitting unit 510 may transmit high-density first channel state information reference information over the entire communication bandwidth. For example, resource blocks or resource elements occupied by ports 1-12 may be used to transmit the first channel state information reference information.

According to an embodiment of the present disclosure, the first channel state information reference information may occupy all subcarriers in the frequency domain, that is, the density of the first channel state information reference information may reach 12 resource elements (REs) per resource block (RB) per port, and the reference signal of each port uses one OFDM symbol. In addition, multiple ports may be multiplexed on the same OFDM symbol in a cyclic shift manner, or transmitted on different OFDM symbols in a TDM manner. Alternatively, the density of the first channel state information reference information may reach 6 resource elements (REs) per resource block (RB) per port, and every two ports are multiplexed in the form of interleaved comb in the frequency domain, occupying one OFDM symbol. Similarly, it may also be multiplexed in the manner of cyclic shift and TDM.

According to another disclosed example, the transmitting unit 510 further transmits channel state information reference information configuration information indicating the first channel state information reference information, and uses resources indicated by the channel state information reference information configuration information to transmit the first channel state information reference information during the training data collection time period. For example, the training data collection time period may include multiple slots.

Thereafter, the receiving unit 520 receives first feedback information for the first channel state information reference information transmitted by the terminal. According to an example of the present disclosure, the terminal may be at least one of a user equipment and a data collection device. In the case where the terminal is a data collection device, the data collection device may transmit the first feedback information for the first channel state information reference information to the base station 500 via a dedicated interface. On the other hand, in the case where the terminal is a user equipment (UE), the transmitting unit 510 may also transmit control signaling to the UE, so as to schedule the UE to transmit the first feedback information for the first channel state information reference information to the base station 500 via a data channel.

For example, the first feedback information may include first channel response information (hereinafter referred to as "channel response data set") obtained from first channel estimation by the terminal according to the high-density first channel state information reference information, and precoding matrix indicator information (hereinafter referred to as "PMI training data set") determined by the terminal according to the channel state information reference information obtained by down-sampling the first channel state information reference information.

According to an example of the present disclosure, the base station shown in FIG. 5 may further include a processing unit 530. The processing unit 530 may train a neural network such as the super-resolution network, the first subnetwork, and the second subnetwork in the base station described above in conjunction with FIG. 3 and FIG. 4 according to the first feedback information, so that the neural network can perform high-precision channel estimation, i.e., perform channel reconstruction, denoising and interpolation, according to the state reference signal fed back by the terminal.

The processing unit 530 may use the PMI training data set and the corresponding channel response data set to train the neural network.

Figure 6:
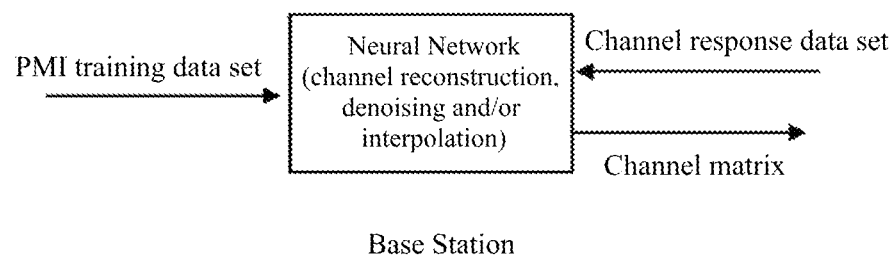
FIG. 6 is a schematic diagram illustrating training of a neural network using a PMI training data set and a corresponding channel response data set according to an example of the present disclosure.

FIG. 6 is a schematic diagram illustrating training of a neural network using the PMI training data set and the corresponding channel response data set according to an example of the present disclosure. As shown in FIG. 6, the processing unit of the base station uses the PMI training data set as a first input of the neural network, so as to use the neural network to perform channel reconstruction, denoising and interpolation according to the first input. The PMI training data set may be used to simulate precoding matrix indicator information transmitted by the terminal during actual deployment. On the other hand, the processing unit of the base station may use the channel response data set of the high-density first channel state information reference information as a second input of the neural network to perform network optimization, so as to, for example, provide the network with a target channel response for a specific PMI training data set.

The base station 500 may be, for example, a dedicated base station for neural network training. After the training is completed, the dedicated base station 500 may provide the trained neural network to a base station that actually communicates with the UE in the communication network, so that the trained neural network can be used for channel reconstruction, denoising and/or interpolation and other operations during actual communication.

As another example, the base station 500 may be used to actually communicate with the UE after the training is completed. During actual deployment, the transmitting unit 510 transmits second channel state information reference information of a second density to the UE, and the receiving unit 520 receives second feedback information for the second channel state information reference information from the UE. The second channel state information reference information may be existing channel state information reference information used for channel estimation in actual communication, and the first density is greater than the second density. That is, the second channel state information reference information is sparser than the first channel state information reference information. The processing unit 530 may use the pre-trained network to perform channel reconstruction, denoising and interpolation according to the second channel state information reference information, so as to obtain a high-precision channel to be used for downlink precoding in actual communication. Furthermore, during actual deployment, the processing unit 530 may perform operations similar to those of the processing unit 320 and the processing unit 420 described above, which will not be repeatedly described herein.

Figure 7:
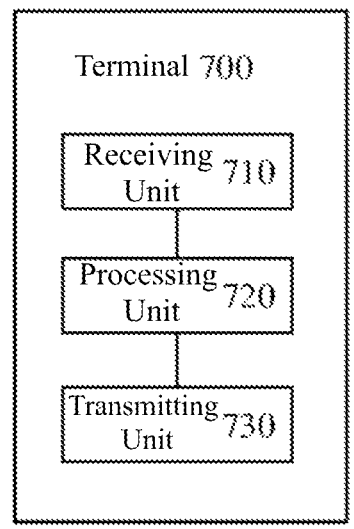
FIG. 7 is a schematic block diagram illustrating a terminal according to an embodiment of the present disclosure.

A terminal corresponding to the base station shown in FIG. 5 according to an embodiment of the present disclosure will be described below with reference to FIG. 7. FIG. 7 is a schematic block diagram illustrating a terminal according to an embodiment of the present disclosure. As shown in FIG. 7, a terminal 700 according to another embodiment of the present disclosure may include a receiving unit 710, a processing unit 720, and a transmitting unit 730. In addition to the transmitting unit, the receiving unit, and the processing unit, the terminal 700 may further include other components. However, since these components are irrelevant to the contents of the embodiments of the present disclosure, illustration and description thereof are omitted herein.

As shown in FIG. 7, the receiving unit 710 receives first channel state information reference information of a first density. As described above, the first channel state information reference information may be used to train a neural network of a base station. According to an example of the present disclosure, the first channel state information reference information may be transmitted over an entire communication bandwidth of the base station, and the first channel state information reference information has a higher density than channel state information reference information used for channel measurement in an actual deployment stage.

Figure 8:
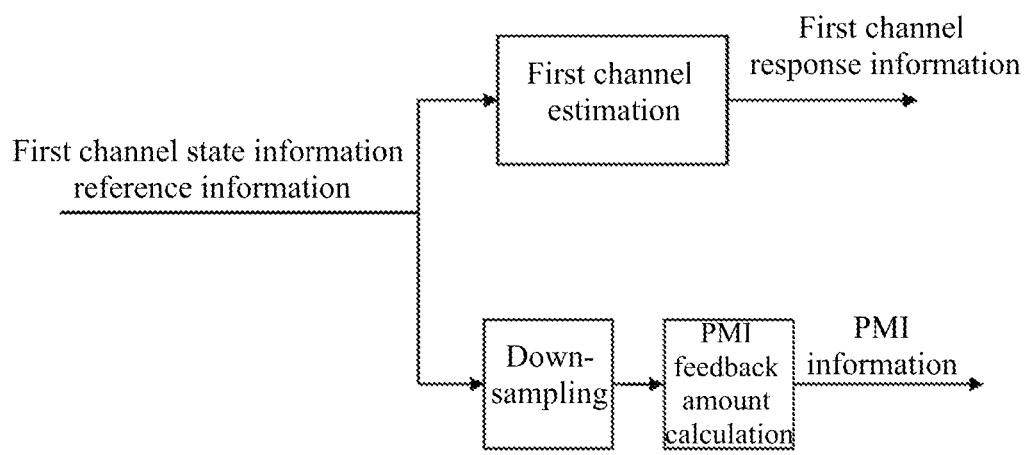
FIG. 8 is a schematic diagram illustrating that a processing unit processes first channel state information reference information according to an example of the present disclosure.

The processing unit 720 performs first channel estimation according to the first channel state information reference information to obtain first channel response information, and performs down-sampling on the first channel state information reference information, and determines precoding matrix indicator information according to the down-sampled channel state information reference information. FIG. 8 is a schematic diagram illustrating that the processing unit 720 processes the first channel state information reference information according to an example of the present disclosure. As shown in FIG. 8, on one hand, the processing unit performs first channel estimation on the high-density first channel state information reference information to obtain high-precision first channel response information. On the other hand, the processing unit down-samples the first channel state information reference information to simulate a density of channel state information reference information received in the actual deployment stage, and obtain a low-density channel. Then, the processing unit performs PMI feedback amount calculation according to the down-sampled channel state information reference information to determine the precoding matrix indicator information.

Returning to FIG. 7, the transmitting unit 730 transmits the first channel response information and the precoding matrix indicator information to the base station. Thus, the base station may train its neural network according to the received first channel response information and precoding matrix indicator information. According to an example of the present disclosure, the terminal 700 may be at least one of a user equipment (UE) and a data collection device. In the case where the terminal 700 is a data collection device for training the neural network of the base station, the transmitting unit 730 may transmit the first channel response information and the precoding matrix indicator information to the base station in multiple ways such as offline or via an air interface. In the case where the terminal 700 is a UE, the transmitting unit 730 may use a precoding matrix indicator feedback channel to transmit the precoding matrix indicator information to the base station, and may use an uplink data channel or an uplink control channel to transmit the first channel response information to the base station after modulation encoding. The base station may perform channel reconstruction, interpolation, denoising, and other training on its neural network according to the first channel response information and the precoding matrix indicator information.

Figure 9:
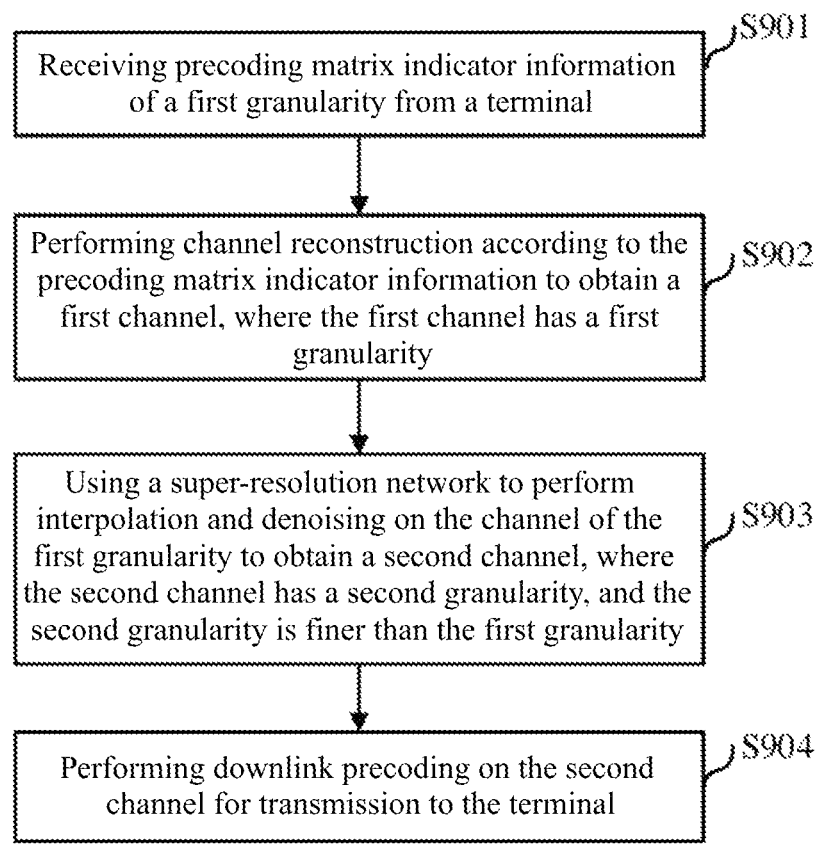
FIG. 9 is a flowchart of a channel processing method according to an embodiment of the present disclosure.

A channel processing method according to an embodiment of the present disclosure will be described below with reference to FIG. 9. FIG. 9 is a flowchart of a channel processing method 900 according to an embodiment of the present disclosure. Since steps of the channel processing method 900 correspond to the operations of the base station 300 described above with reference to the figures, detailed descriptions of the same contents are omitted herein for simplicity.

As shown in FIG. 9, in step S901, precoding matrix indicator information of a first granularity is received from a terminal. In step S902, channel reconstruction is performed according to the precoding matrix indicator information to obtain a first channel, where the first channel has the first granularity. For example, in step S902, amplitude information and phase information in the received PMI information may be used to perform amplitude and phase weighting on space domain (also referred to as "beam domain")-frequency domain channel codewords of multiple beams respectively, and the weighted vectors are combined to obtain a first channel with a subband level. The combined subband-level first channel may be expressed in the form of a space-frequency domain channel matrix, where a space-domain value of the space-frequency domain channel matrix may be the number of antennas used by the base station to communicate with the terminal, and a frequency-domain value may be determined according to the number of subbands over which the base station communicates with the terminal.

Then, in step S903, a super-resolution network is used to perform interpolation and denoising on the channel of the first granularity to obtain a second channel, where the second channel has a second granularity, and the second granularity is finer than the first granularity.

According to an example of the present disclosure, the method shown in FIG. 9 may further include preprocessing the first channel before inputting the first channel of the first granularity into the super-resolution network, so as to facilitate subsequent operations of the super-resolution network. For example, in the case where the first channel is a space-frequency domain channel, Fourier transform may be performed on the first channel to transform the space-frequency domain channel into a beam-delay domain channel. In addition, since in the beam-delay domain, channel delay components are mainly concentrated in a header of a delay-domain channel matrix, the delay-domain channel may be truncated, the header is kept, and the truncated data is divided into two channels, a real part and an imaginary part, as inputs to the super-resolution network. By transforming the first channel to be processed into the delay domain and truncating the data, computational complexity of the super-resolution network can be reduced.

In addition, in order to further simplify the operations of the super-resolution network, the method shown in FIG. 9 may further include using conventional interpolation methods such as zero-filling, linear interpolation, nearest neighbor interpolation and the like to pre-interpolate the first channel, to obtain a channel of a desired frequency-domain accuracy (e.g., the RB level or the subcarrier level).

Finally, in step S904, downlink precoding is performed on the second channel for transmission to the terminal. In the channel processing method described in conjunction with FIG. 9, after traditional channel reconstruction according to the precoding matrix indicator information, the super-resolution network is used to perform interpolation and denoising on the channel of the first granularity to obtain the second channel with a finer granularity for downlink precoding.

Figure 10:
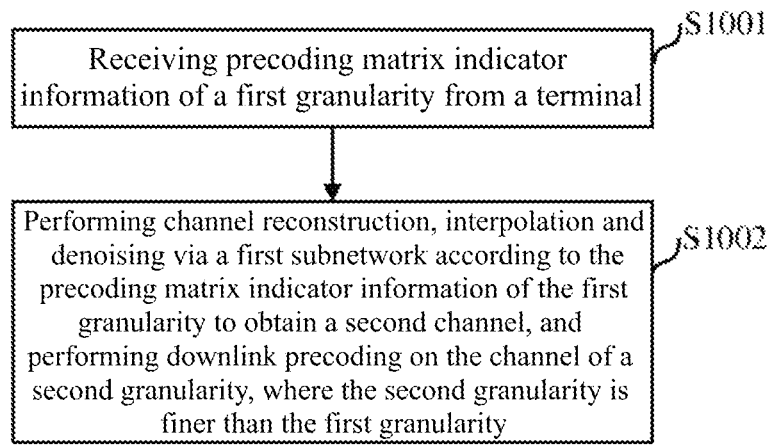
FIG. 10 is a flowchart of a channel processing method according to another embodiment of the present disclosure.

According to another embodiment of the present disclosure, in addition to interpolation and denoising, a neural network may further be used to perform channel reconstruction according to the precoding matrix indicator information of the first granularity received from the terminal. Next, a channel processing method according to another embodiment of the present disclosure will be described with reference to FIG. 10. FIG. 10 is a flowchart of a channel processing method 1000 according to another embodiment of the present disclosure. Since steps of the channel processing method 1000 correspond to the operations of the base station 400 described above with reference to the figures, detailed descriptions of the same contents are omitted herein for simplicity.

As shown in FIG. 10, in step S1001, precoding matrix indicator information of a first granularity is received from a terminal. For example, subband-level PMI information of Type II may be received from the terminal. Specifically, PMI information of Type II may include subband-level amplitude information and phase information.

In step S1002, channel reconstruction, interpolation and denoising are performed via a first subnetwork according to the precoding matrix indicator information of the first granularity to obtain a second channel, and downlink precoding is performed on the channel of a second granularity, where the second granularity is finer than the first granularity. Specifically, the first subnetwork may be a first sub-neural network.

According to an example of the present disclosure, an input dimension of the first subnetwork may be higher than an output dimension of the first subnetwork. In other words, the first subnetwork adopts a high-dimensional input and low-dimensional output design. Because of the high-dimensional input, original information from the precoding matrix indicator information can be reserved, and because of the low-dimensional output, network complexity and training difficulty can be reduced by dimension reduction in a network processing process.

Specifically, an input of the first subnetwork may be the precoding matrix indicator information from the terminal or preprocessed precoding matrix indicator information, and the first subnetwork may perform input reconstruction on the precoding matrix indicator information. According to an example of the present disclosure, in step S1002, the first subnetwork may weight and combine magnitude and phase of the input data. For example, the precoding matrix indicator information may include amplitude information and phase information. Furthermore, the amplitude information may include wideband beam information, wideband amplitude information of each beam, and subband amplitude information of each subband as well as subband phase information of each subband that the base station communicates with the terminal. In step S1002, the first subnetwork may combine the wideband beam information and the wideband amplitude information of each beam, and the subband amplitude information of each subband to obtain a channel amplitude matrix. Specifically, the first subnetwork may obtain the channel amplitude matrix in each polarization direction respectively according to polarization directions of elements of an antenna array. In addition, in step S1002, the first subnetwork may obtain a real part matrix and an imaginary part matrix according to the wideband beam information of each beam and the phase information of each subband. Similarly, the first subnetwork may obtain the real part matrix and the imaginary part matrix in each polarization direction respectively according to polarization directions of beams. Then, in each polarization direction, the first subnetwork may multiply the channel amplitude matrix by the real part matrix and the imaginary part matrix in that polarization direction, respectively, to obtain a beam-frequency domain channel matrix (also referred to as "beam-frequency domain channel").

Next, in step S1002, the first subnetwork may perform Fourier transform on the beam-frequency domain channel to transform the beam-frequency domain channel into a beam-delay domain channel. In addition, since in the beam-delay domain, channel delay components are mainly concentrated at a header of a delay-domain channel matrix, the first subnetwork may truncate the delay-domain channel to reduce output dimension.

According to an example of the present disclosure, the first subnetwork may include a fully connected layer (or dense layer), and perform input reconstruction on the precoding matrix indicator information through the fully connected layer. Specifically, the fully connected layer weights and combines amplitude and phase of the input data to obtain a beam-frequency domain channel, transforms the beam-frequency domain channel into a beam-delay domain channel, and truncates the beam-delay domain channel to reduce output dimension of the network. Alternatively, since operation required in the weighting and combination process is only to multiply corresponding elements of respective matrices, the corresponding fully connected layer may be replaced by a partially connected layer, which only connects elements that need to be directly multiplied.

According to another example of the present disclosure, the first subnetwork may further include one or more super-resolution networks for interpolation and denoising. The one or more super-resolution networks may be set before or after the fully-connected layer or the partially-connected layer described above. In addition, the above-mentioned fully connected layer or partially connected layer may also be set between multiple super-resolution networks.

For example, the super-resolution network may be set before the fully connected layer or the partially connected layer to perform interpolation and denoising on the precoding matrix indicator information from the terminal. The interpolated and denoised data are then input to the fully connected layer or the partially connected layer for channel reconstruction and dimensionality reduction. As another example, the precoding matrix indicator information from the terminal may be input to the fully connected layer or the partially connected layer for channel reconstruction and dimensionality reduction firstly, and then the resulted channel may be input into the super-resolution network for interpolation and denoising. As another example, the precoding matrix indicator information from the terminal may be input to a first super-resolution network for denoising. The denoised data is then input to the fully connected layer or the partially connected layer for channel reconstruction and dimensionality reduction. Finally, the dimensionally reduced channel is input to a second super-resolution network for interpolation.

Optionally, the method shown in FIG. 10 may further include performing, via a second subnetwork, at least one of time-domain channel estimation enhancement and time-domain prediction on a plurality of second channels obtained according to precoding matrix indicator information transmitted from a same terminal for multiple times. For example, the first subnetwork may process the precoding matrix indicator information transmitted by the terminal once (e.g., within a single slot), and perform channel reconstruction, interpolation, and denoising based on the precoding matrix indicator information transmitted by the terminal once. The second subnetwork includes at least one of RNN and LSTM networks, and the second subnetwork may input the precoding matrix indicator information transmitted by the same terminal for multiple times to the RNN/LSTM network to realize at least one of time-domain channel estimation enhancement and time-domain prediction.

Figure 11:
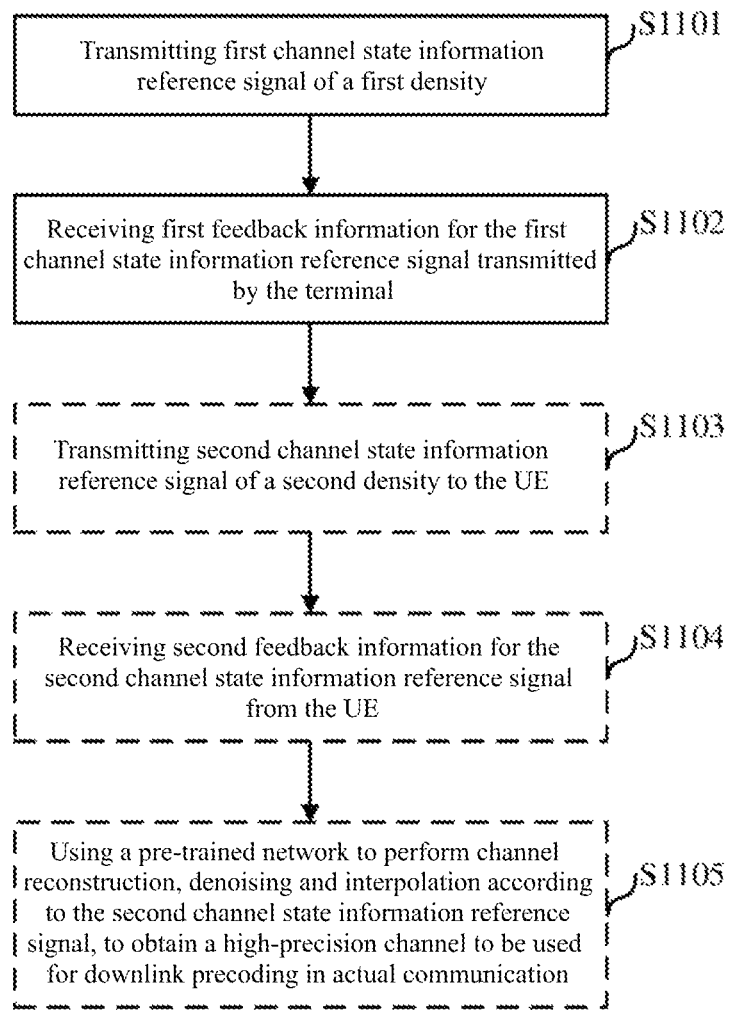
FIG. 11 is a flowchart of a reference signal transmitting method according to an embodiment of the present disclosure.

A reference signal transmitting method according to an embodiment of the present disclosure will be described below with reference to FIG. 11. FIG. 11 is a flowchart of a reference signal transmitting method 1100 according to an embodiment of the present disclosure. Since steps of the reference signal transmitting method 1100 correspond to the operations of the base station 500 described above with reference to the figures, detailed descriptions of the same contents are omitted herein for simplicity.

As shown in FIG. 11, in step S1101, first channel state information reference information of a first density is transmitted to a terminal. The first density may be a high density. In addition, according to an example of the present disclosure, in step S1101, the first channel state information reference information is transmitted over an entire communication bandwidth of a base station at the first density. In other words, in step S1101, the high-density first channel state information reference information may be transmitted over the entire communication bandwidth.

According to another disclosed example, the method 1100 may further include transmitting channel state information reference information configuration information indicating the first channel state information reference information, and using resources indicated by the channel state information reference information configuration information during the training data collection time period to transmit the first channel state information reference information. For example, the training data collection time period may include multiple slots.

Then, in step S1102, first feedback information for the first channel state information reference information transmitted by the terminal is received. According to an example of the present disclosure, the terminal may be at least one of a user equipment and a data collection device. In the case where the terminal is a data collection device, the data collection device may transmit the first feedback information for the first channel state information reference information to the base station via a dedicated interface. On the other hand, in the case where the terminal is a user equipment (UE), the method 1100 may further transmit control signaling to the UE, so as to schedule the UE to transmit the first feedback information for the first channel state information reference information to the base station 500 through a data channel.

For example, the first feedback information may include first channel response information (hereinafter referred to as "channel response data set") obtained from first channel estimation by the terminal according to the high-density first channel state information reference information, and precoding matrix indicator information (hereinafter referred to as "PMI training data set") determined by the terminal according to the channel state information reference information obtained by down-sampling the first channel state information reference information. The processing unit 530 may use the PMI training data set and the corresponding channel response data set to train the neural network.

In addition, according to another example of the present disclosure, the method 1100 may further include training a neural network such as the super-resolution network, the first subnetwork, and the second subnetwork in the base station described above in conjunction with FIG. 3 and FIG. 4 according to the first feedback information, so that the neural network can perform high-precision channel estimation, i.e., perform channel reconstruction, denoising and interpolation, according to the state reference signal fed back by the terminal.

The base station may be, for example, a dedicated base station for neural network training. After the training is completed, the dedicated base station may provide the trained neural network to a base station that actually communicates with the UE in the communication network, so that the trained neural network can be used for channel reconstruction, denoising and/or interpolation and other operations during actual communication.

As another example, the base station may be used to actually communicate with the UE after the training is completed. In this case, during actual deployment, as shown in FIG. 11, in step S1103, second channel state information reference information of a second density is transmitted to the UE. And in step S1104, second feedback information for the second channel state information reference information is received from the UE. The second channel state information reference information may be existing channel state information reference information used for channel estimation in actual communication, and the first density is greater than the second density. That is, the second channel state information reference information is sparser than the first channel state information reference information. Then, in step S1105, the pre-trained network is used to perform channel reconstruction, denoising and interpolation according to the second channel state information reference information, so as to obtain a high-precision channel for downlink precoding in actual communication.

Figure 12:
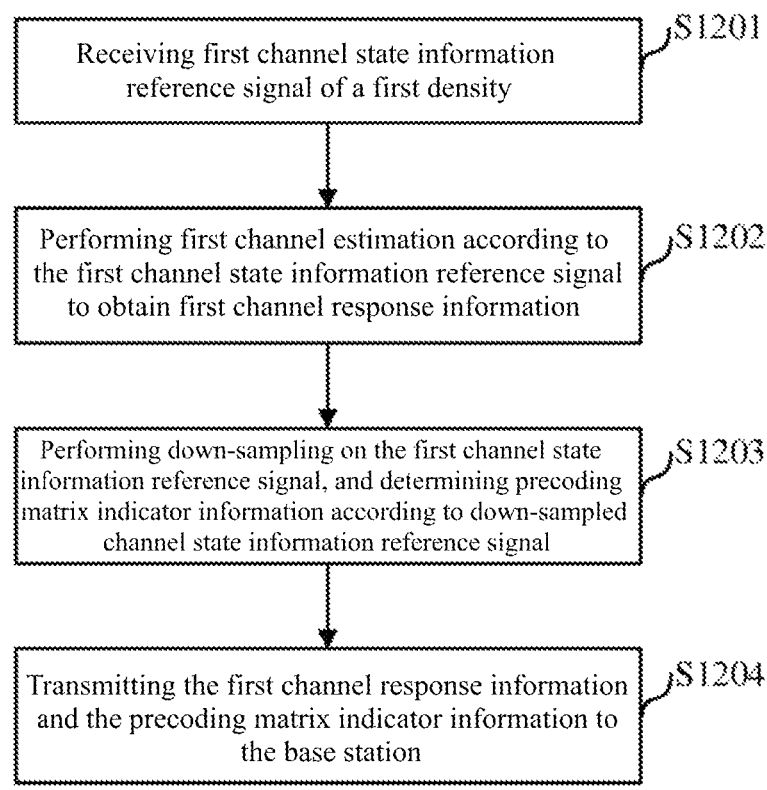
FIG. 12 is a flowchart of an information transmitting method according to an embodiment of the present disclosure.

An information transmitting method performed by a terminal according to an embodiment of the present disclosure will be described below with reference to FIG. 12. FIG. 12 is a flowchart of an information transmitting method 1200 according to an embodiment of the present disclosure. Since steps of the reference signal transmitting method 1200 correspond to the operations of the terminal 700 described above with reference to the figures, detailed descriptions of the same contents are omitted herein for simplicity.

As shown in FIG. 12, in step S1201, first channel state information reference information of a first density is received. As described above, the first channel state information reference information may be used to train a neural network of a base station. According to an example of the present disclosure, the first channel state information reference information may be transmitted over an entire communication bandwidth of the base station, and the first channel state information reference information has a higher density than that of channel state information reference information used for channel measurement in an actual deployment stage.

In step S1202, first channel estimation is performed according to the first channel state information reference information to obtain first channel response information. And in step S1203, down-sampling is performed on the first channel state information reference information, and precoding matrix indicator information is determined according to the down-sampled channel state information reference information. Although it is illustrated in FIG. 12 by performing step S1202 before step S1203 as an example, the present disclosure is not limited thereto. For example, step S1203 may be performed first and then step S1201, or step S1202 and step S1203 may be performed simultaneously.

Then in step S1204, the first channel response information and the precoding matrix indicator information are transmitted to the base station. Thus, the base station may train its neural network according to the received first channel response information and precoding matrix indicator information.

<Hardware Structure>

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. wired and/or wirelessly), and the respective functional blocks may be implemented by these apparatuses.

Figure 13:
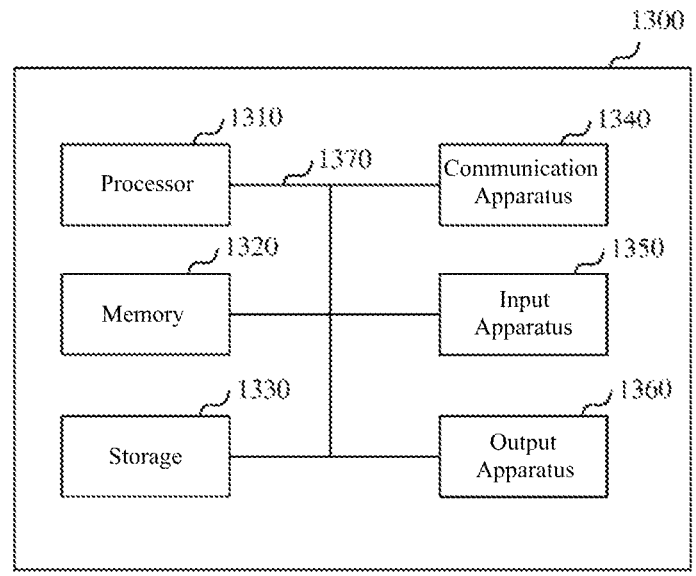
FIG. 13 is a schematic diagram of a hardware structure of a device involved according to an embodiment of the present disclosure.

For example, a first network element in an embodiment of the present disclosure may function as a computer that executes the processes of the wireless communication method of the present disclosure. FIG. 13 is a schematic diagram of a hardware structure of a device 1300 (a base station or terminal) involved in an embodiment of the present disclosure. The above device 1300 (a base station or terminal) may be constituted as a computer apparatus that physically comprises a processor 1310, a memory 1320, a storage 1330, a communication apparatus 1340, an input apparatus 1350, an output apparatus 1360, a bus 1370 and the like.

In addition, in the following description, terms such as "apparatus" may be replaced with circuits, devices, units, and the like. The hardware structure of the first network element may include one or more of the respective apparatuses shown in the figure, or may not include a part of the apparatuses.

For example, only one processor 1310 is illustrated, but there may be multiple processors. Furthermore, processes may be performed by one processor, or processes may be performed by more than one processor simultaneously, sequentially, or with other methods. In addition, the processor 1310 may be installed by more than one chip.

Respective functions of any of the device 1300 may be implemented, for example, by reading specified software (program) on hardware such as the processor 1310 and the memory 1320, so that the processor 1310 performs computations, controls communication performed by the communication apparatus 1340, and controls reading and/or writing of data in the memory 1320 and the storage 1330.

The processor 1310, for example, operates an operating system to control the entire computer. The processor 1310 may be constituted by a Central Processing Unit (CPU), which includes interfaces with peripheral apparatuses, a control apparatus, a computing apparatus, a register and the like. For example, the processing unit described above may be implemented by the processor 1310.

In addition, the processor 1310 reads programs (program codes), software modules and data from the storage 1330 and/or the communication apparatus 1340 to the memory 1320, and execute various processes according to them. As for the program, a program causing computers to execute at least a part of the operations described in the above embodiments may be employed. For example, the processing unit of the first network element may be implemented by a control program stored in the memory 1320 and operated by the processor 1310, and other functional blocks may also be implemented similarly.

The memory 1320 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 1320 may also be referred to as a register, a cache, a main memory (a main storage apparatus) and the like. The memory 1320 may store executable programs (program codes), software modules and the like for implementing a method involved in an embodiment of the present disclosure.

The storage 1330 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 1330 may also be referred to as an auxiliary storage apparatus.

The communication apparatus 1340 is a hardware (transceiver device) performing communication between computers via a wired and/or wireless network, and is also referred to as a network device, a network controller, a network card, a communication module and the like, for example. The communication apparatus 1340 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like described above may be implemented by the communication apparatus 1340.

The input apparatus 1350 is an input device (e.g., a keyboard, a mouse, a microphone, a switch, a button, a sensor and the like) that receives input from the outside. The output apparatus 1360 is an output device (e.g., a display, a speaker, a Light Emitting Diode (LED) light and the like) that performs outputting to the outside. In addition, the input apparatus 1350 and the output apparatus 1360 may also be an integrated structure (e.g., a touch screen).

Furthermore, the respective apparatuses such as the processor 1310 and the memory 1320 are connected by the bus 1370 that communicates information. The bus 1370 may be constituted by a single bus or by different buses between the apparatuses.

Furthermore, the electronic device may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 1310 may be installed by at least one of these hardware.

(Variations)

In addition, terms illustrated in the present specification and/or terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a pilot, a pilot signal and so on, depending on the standard applied. Furthermore, a component carrier (CC) may also be referred to as a cell, a frequency carrier, a carrier frequency, and the like.

Furthermore, information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

Names used for parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limitative in any respect.

Information, signals and the like described in this specification may be represented by using any of a variety of different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

Information, signals and the like that are input or output may be stored in a specific location (for example, in a memory), or may be managed in a control table. Information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, Downlink Control Information (DCI), Uplink Control Information (UCI)), higher layer signaling (for example, RRC (Radio Resource Control) signaling, broadcast information (Master Information Blocks (MIBs), System Information Blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as RRC messages, for example, RRC connection setup messages, RRC connection reconfiguration messages, and so on. Furthermore, MAC signaling may be reported by using, for example, MAC Control Elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. A base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Header (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, a wireless base station in this specification may also be replaced with a user terminal. For example, for a structure in which communication between a wireless base station and a user terminal is replaced with communication between a plurality of user terminals (Device-to-Device, D2D), the respective manners/embodiments of the present disclosure may also be applied. In this case, functions provided by the electronic device described above may be regarded as functions provided by a user terminal. Furthermore, the words "uplink" and "downlink" may also be replaced with "side". For example, an uplink channel may be replaced with a side channel.

Also, a user terminal in this specification may be replaced with a wireless base station. In this case, functions provided by the above user terminal may be regarded as functions provided by a first communication device and a second communication device.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched to use during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize Long Term Evolution (LTE), Advanced Long Term Evolution (LTE-A, LTE-Advanced), Beyond Long Term Evolution (LTE-B, LTE-Beyond), the super 3rd generation mobile communication system (SUPER 3G), Advanced International Mobile Telecommunications (IMT-Advanced), the 4th generation mobile communication system (4G), the 5th generation mobile communication system (5G), Future Radio Access (FRA), New Radio Access Technology (New-RAT), New Radio (NR), New radio access (NX), Future generation radio access (FX), Global System for Mobile communications (GSMKR), Code Division Multiple Access 3000 (CDMA 3000), Ultra Mobile Broadband (UMB), IEEE 920.11 (Wi-Fi®)), IEEE 920.16 (WiMAX®), IEEE 920.20, Ultra-Wide Band (UWB), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting, accessing (e.g., accessing data in a memory), etc. as performing the "deciding (determining)". In addition, the "deciding (determining)" may further regard resolving, selecting, choosing, establishing, comparing, etc. as performing the "deciding (determining)". That is, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described above in detail, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

What is claimed is:

1. A base station, comprising:
   a communication apparatus configured to:
   transmit first channel state information reference information of a first density to a terminal; and
   receive first feedback information for the first channel state information reference information from the terminal,
   wherein the first feedback information comprises first channel response information obtained from first channel estimation by the terminal according to the first channel state information reference information, and precoding matrix indicator information determined by the terminal according to down-sampled first channel state information reference information, and
   the base station further uses a trained neural network to perform channel reconstruction, denoising and interpolation according to second feedback information received from the terminal.

2. The base station of claim 1, wherein
   the communication apparatus transmits the first channel state information reference information over an entire communication bandwidth of the base station at the first density.

3. The base station of claim 1, wherein
   the communication apparatus is further configured to transmit channel state information reference information configuration information indicating the first channel state information reference information; and the communication apparatus is further configured to trigger measurement of the first channel state information reference information at a specific training data collection time.

* * * * *